(12) United States Patent
Quadling et al.

(10) Patent No.: US 11,559,088 B2
(45) Date of Patent: Jan. 24, 2023

(54) FINGER PROTECTOR, AND METHOD OF MAKING

(71) Applicant: Sentient Reality LLC, Plano, TX (US)

(72) Inventors: Mark S. Quadling, Plano, TX (US); Henley S. Quadling, Dallas, TX (US)

(73) Assignee: Sentient Reality LLC, Plano, TX (US)

( * ) Notice: Subject to any disclaimer, the term of this patent is extended or adjusted under 35 U.S.C. 154(b) by 384 days.

(21) Appl. No.: 16/804,151

(22) Filed: Feb. 28, 2020

(65) Prior Publication Data

US 2020/0297051 A1 Sep. 24, 2020

Related U.S. Application Data

(60) Provisional application No. 62/812,510, filed on Mar. 1, 2019.

(51) Int. Cl.
| | |
|---|---|
| *B29C 64/393* | (2017.01) |
| *A41D 13/08* | (2006.01) |
| *A41D 19/00* | (2006.01) |
| *A41D 19/015* | (2006.01) |
| *B29K 75/00* | (2006.01) |
| *B33Y 10/00* | (2015.01) |
| *B33Y 50/02* | (2015.01) |

(Continued)

(52) U.S. Cl.
CPC ....... *A41D 13/087* (2013.01); *A41D 19/0058* (2013.01); *A41D 19/0157* (2013.01); *A41D 19/01594* (2013.01); *B29C 64/393* (2017.08); *B29K 2075/00* (2013.01); *B29L 2031/4864* (2013.01); *B33Y 10/00* (2014.12); *B33Y 50/02* (2014.12); *B33Y 80/00* (2014.12)

(58) Field of Classification Search
CPC ..... A41D 13/087; B29C 64/393; B33Y 50/02
See application file for complete search history.

(56) References Cited

U.S. PATENT DOCUMENTS

| | | | |
|---|---|---|---|
| 6,243,868 | B1 | 6/2001 | Wanzenried |
| 6,925,653 | B1 | 8/2005 | King |
| 8,856,963 | B2 | 10/2014 | Nagda et al. |

(Continued)

FOREIGN PATENT DOCUMENTS

| | | | | |
|---|---|---|---|---|
| CN | 104814545 A | * | 8/2015 | ............. A41D 19/00 |
| WO | WO-2017142953 A1 | * | 8/2017 | ........... G06F 17/175 |

OTHER PUBLICATIONS

"Gorilla Tips," https://www.guitarcenter.com/Gorilla-Tips/Fingertip-Protectors.gc Guitar Center, at least as early as Mar. 1, 2019.

(Continued)

*Primary Examiner* — James Sanders
(74) *Attorney, Agent, or Firm* — David H. Judson (57) ABSTRACT

The subject matter relates generally to devices configured to be attached to fingers and/or the hands of persons and which may aid in the playing of musical instruments. These devices are custom made to fit the fingers of a particular musician or aspiring musician precisely and optionally include an additional feature or element at the tip which beneficially improves the ability to play. These devices also may protect the fingers from the adverse effects of prolonged playing. These devices may be used independently on each finger, or may be combined together into a glove with the finger devices attached to the rest of a custom fitting glove.

12 Claims, 11 Drawing Sheets

(51) Int. Cl.
    *B33Y 80/00*         (2015.01)
    *B29L 31/48*         (2006.01)

(56) References Cited

U.S. PATENT DOCUMENTS 9,899,010 B2      2/2018   Dutton
10,016,941 B1 *   7/2018   Beard ................ G05B 19/4097
10,441,009 B1    10/2019   Ivany

OTHER PUBLICATIONS

"12pcs Guitar Fingertip Protectors Silicone Finger Guards for Ukulele Electric/Acoustic Guitar Bass," at least as early as Dec. 1, 2018, https://www.tomtop.com/p-i3126.html?aid=C25427.

\* cited by examiner

FINGER PROTECTOR, AND METHOD OF MAKING

BACKGROUND

Technical Field

This application relates generally to devices configured to be attached to fingers and/or the hands of persons and which protect the user's fingers and/or aid in the playing of musical instruments.

Background of the Related Art

Figure 1:
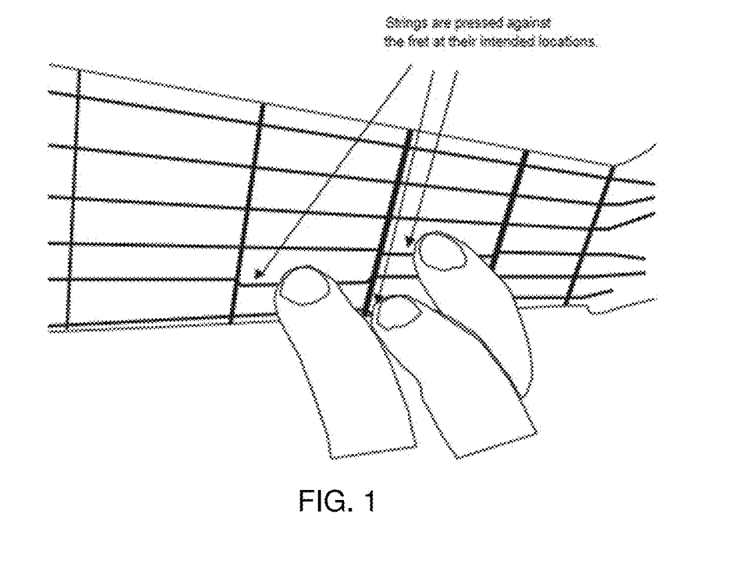
FIG. 1 depicts a portion of a guitar neck and how a user (player) positions his or her fingers on the fretboard to form a chord.

The process of playing a guitar is well known and understood. The user's fretting hand is used to press one or more strings at different locations causing the strings to have different lengths and thereby vibrate with different frequencies when plucked or strummed by the non-fret hand. Those frequencies vary according to where the string is pressed down to the fretboard with higher pitched sounds corresponding to shorter strings. The playing of chords corresponds to several strings being pressed at the same time so that the superposition of the various differing frequencies of vibration result in a composite sound which is desired by the musician. FIG. 1 demonstrates the fretting hand selecting a chord.

Figure 2:
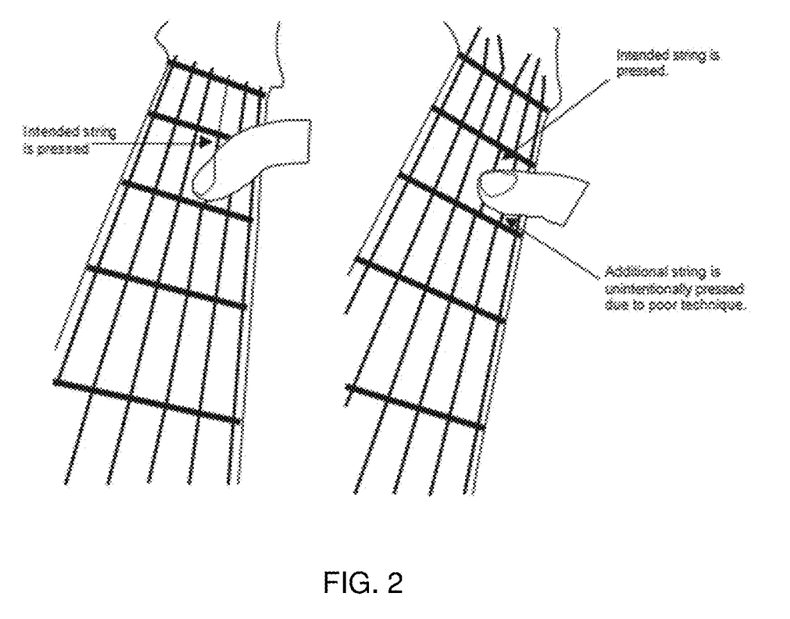
FIG. 2 depicts a correct (left) and incorrect (right) technique for fretting a note on the guitar neck.
Figure 3:
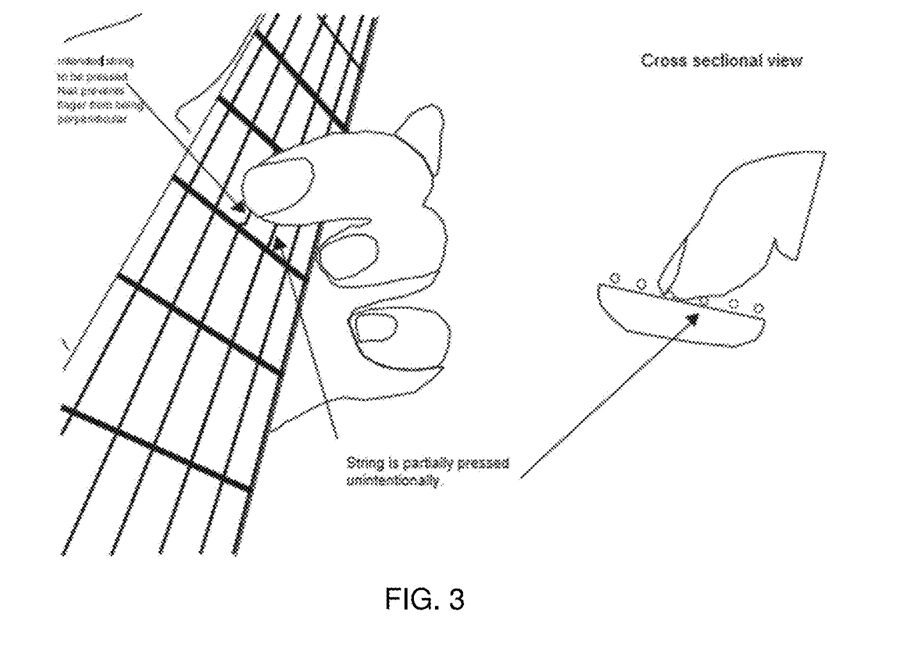
FIG. 3 depicts how a user's untrimmed nail causes the finger to interfere with a nearby string unintentionally, thereby providing an undesirable playing result.
Figure 4:
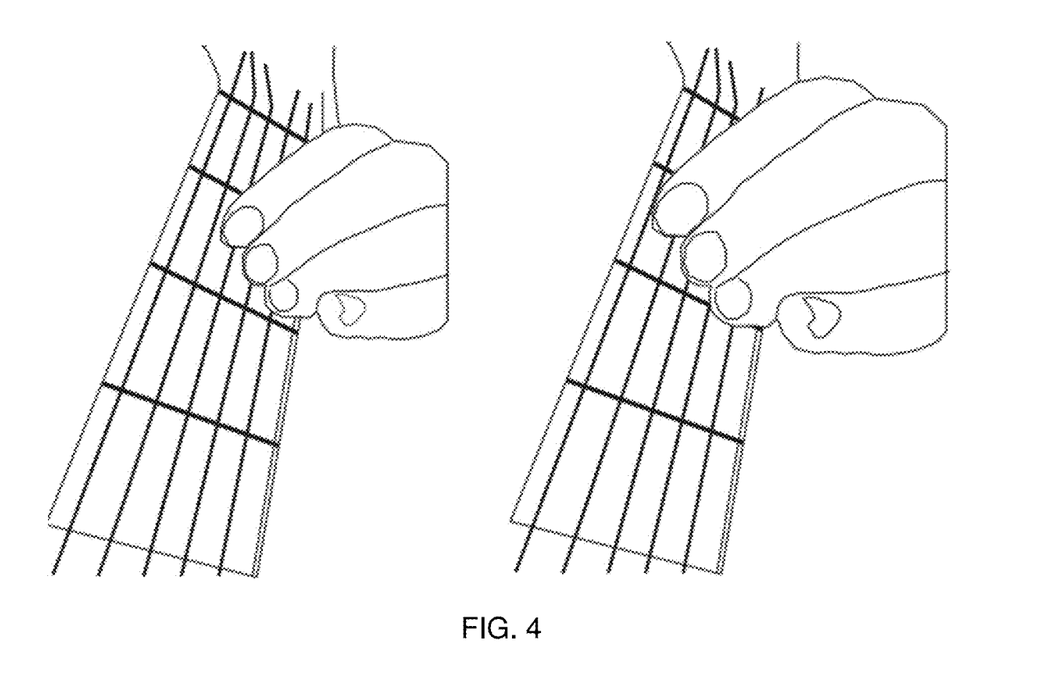
FIG. 4 depicts how the size of the user's fingers can potentially interfere with the user's ability to play the instrument without interference.

When selecting notes or chords, each finger should press only the intended string and not interfere with the other strings. Doing so will result in the other strings exhibiting sounds of buzzing or even muting due to the other string being deadened by the accidental contact. To achieve this, the musician attempts to press the tip of the finger as perpendicular as possible to the fretboard so as to minimize the accidental interaction with the neighboring strings. FIG. 2 demonstrates the preferred technique (on the left) as well as an incorrect technique (on the right) with respect to selecting a single note. As described above, selecting individual notes or chords relies on the technique where each finger presses down on only one string, without touching any other string unintentionally. To achieve this, the tip of finger must be placed so that the axis of the finger is nearly perpendicular to the fretboard surface. This is demonstrated on the left in FIG. 2. Typically, this is only possible if the nail is closely cut. FIG. 3 shows a case where due to the length of the fingernail, it is not possible for the player to orient his or her finger so that it is perpendicular to the fretboard, and consequently the finger may interfere with an adjacent string (as shown on the right). Besides this being a cosmetic issue for some people who would otherwise choose to not cut the nail, in some individuals the nail is unable to be trimmed back sufficiently without pain or discomfort due to a prominent onychodermal band or solehorn cuticle. In some individuals with large fingers, the fingertips themselves are too large to be used without interference with unintended strings. Also, in some cases, the fingers are too large for certain chords. FIG. 4 (on the right side) demonstrates a situation where fingers that are too large cannot play the chord.

Another common issue facing a person learning to play on the guitar is the toughening up that is required for the fingertips. The repeated contact with the strings, especially steel strings, can cause severe pain. For a person to have the ability to play a stringed instrument without developing painful finger tips, it is necessary for them to develop calluses on their fingertips. The calluses are the natural reaction the fingertips develop to the repeated (painful) interaction with the guitar strings. Beginner guitar players may have an initial session of only 30 minutes in duration, and yet have painfully sore fingers that may discourage or even preclude practicing on the instrument the very next day. Most beginner guitar players typically require at least a month to develop sufficiently tough calluses for them to play the instrument without pain or discomfort. It is well understood, however, that the pain of practicing has to be tolerated to initially toughen the skin on the finger tips.

Most beginner guitar players require at least a month to develop sufficiently tough calluses. After some period of not playing, however, the fingertip calluses may soften or peel off. Some guitar players also have issues with numbness or cracked and peeling calluses. The device described herein essentially describes a mechanism to replace the requirement of the calluses, while providing a suitable pressure surface to depress the string that may be optimized for the particular stringed instrument, the specific anatomical structure of the person's fingers and the technique of playing the instrument, without necessarily reducing the sensitivity of the finger tips. Some people are discouraged from playing the guitar due to the unsightly appearance of the fingertip calluses.

Another barrier to entry for some aspiring guitar players is the requirement to keep finger nails trimmed as short as possible. The hyponychium is the area of epithelium, particularly the thickened portion, underlying the free edge of the nail plate on the nail. Its proximal border is immediately distal to the distal limit of the nail bed, also known as the onychodermal band (the line along the interface of the nail bed and the nail plate). Its distal edge borders the free edge of the nail plate, namely, where that edge would project downwards onto the epidermis. In some people, the location of the hyponychium extends past the distal end of the finger, and this precludes close nail trimming without causing injury and possibly infection to the nail bed. In addition to the people who are unable to trim their finger nails short enough to play the guitar effectively, there are also the people who do not wish to trim their nails too short, for cosmetic reasons.

Figure 5:
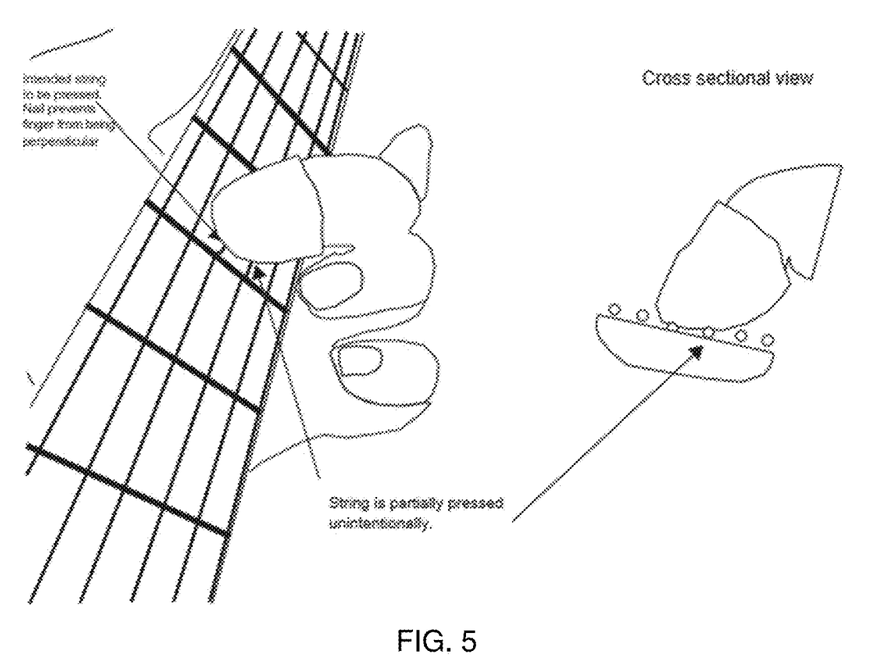
FIG. 5 depicts a known prior art solution wherein the user wears a generic finger cover on his or her first finger.
Figure 6:
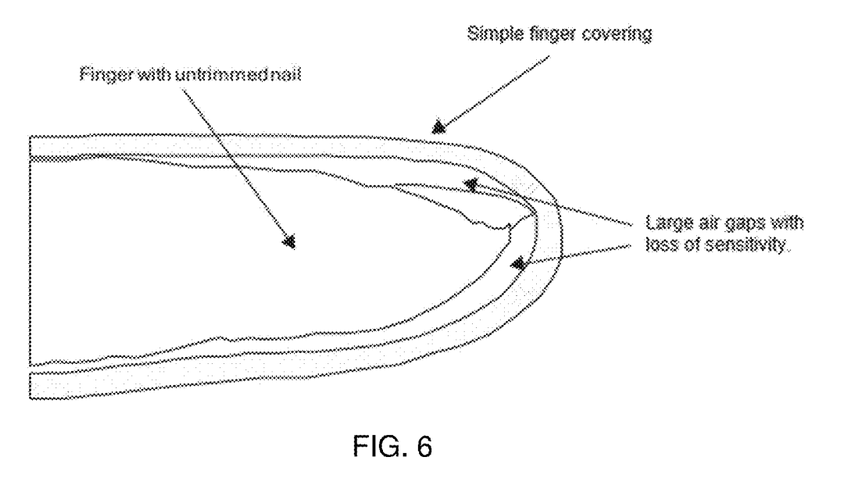
FIG. 6 depicts the prior art finger cover in FIG. 5 and its relative positioning with respect to the user's finger.

There are fingertip protectors available today consisting of a simple cover or rubber "thimble" for each finger. These protectors are not custom, but rather are available in broad size categories and by necessity need to be fairly tight so as to not become too loose. These finger protectors do not solve the issue for big fingers or for fingers with nails that cannot be trimmed sufficiently. For example, FIG. 5 depicts the playing situation of FIG. 3, except for a protective cover and demonstrates how the simplistic cover in this case in fact exacerbates the situation (on the right) by causing adjacent string interference. FIG. 6 depicts the prior art thimble positioned on the user's finger having an untrimmed nail, and this shows the large air gaps with the attendant loss of (playing) sensitivity that results from the poor fit. Because of the non-custom designs there will be areas of increased air gap, and in addition the protectors will need to be constructed with a tight fit so as to not fall off. This necessarily means that those portions that have the least air gap to the actual finger will be tight. FIG. 6 demonstrates the lack of conformity between the internal surface of a non-custom finger protector and the finger surface itself. Such devices are less comfortable with less sensitivity while also not solving the issue of insufficiently trimmed nails or large fingers.

The techniques of this disclosure address these and other deficiencies of the known prior art.

BRIEF SUMMARY

The subject matter herein relates generally to devices configured to be attached to fingers and/or the hands of persons and which may aid in the playing of musical instruments. These devices preferably are custom made to fit the fingers of a particular musician or aspiring musician precisely and may include an additional feature or element at the tip which beneficially improves the ability to play. These devices also may protect the fingers from the adverse effects of prolonged playing. These devices may be used independently on each finger, or may be combined together into a glove with the finger devices attached to the rest of a custom fitting glove. Without intending to be limiting (regarding potential use cases), the device described herein provides a mechanism to replace the requirement of the calluses, while providing a suitable pressure surface to depress the string that may be optimized for the particular stringed instrument, the specific anatomical structure of the person's fingers and the technique of playing the instrument, without necessarily reducing the sensitivity of the player's fingertips.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

The subject matter herein may be used with many different stringed musical instruments, but for the sake of the discussion the following description is provided in the context of a guitar. Nothing restricts the subject matter, however, from being used with other similar types of stringed instruments including banjos, ukuleles, violins, cellos, basses, etc. The person playing the guitar is sometimes referred to herein as a musician, but this designation is not intended to be limiting, as the "user" or "player" in this context means any person, whether familiar and proficient with guitar playing, as well as a beginner with no prior experience. The device described herein essentially describes a mechanism to replace the requirement of the calluses, while providing a suitable pressure surface to depress the string that may be optimized for the particular stringed instrument, the specific anatomical structure of the person's fingers and the technique of playing the instrument, without necessarily reducing the sensitivity of the finger tips.

According to this disclosure, a finger protector is described, together with a method of its manufacture. Unlike the prior art, the finger protector herein is custom-designed to fit to a particular user's finger (i.e. physical anatomy), and the manufacturing process as described facilitates this customization.

Figure 7:
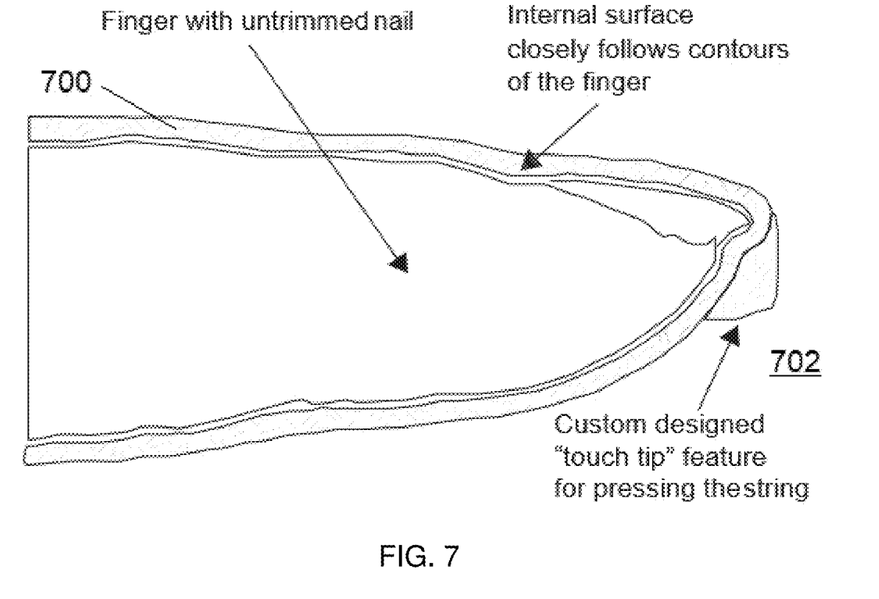
FIG. 7 depicts an embodiment of the custom-fitted finger protector of this disclosure fitted onto the user's finger.
Figure 8:
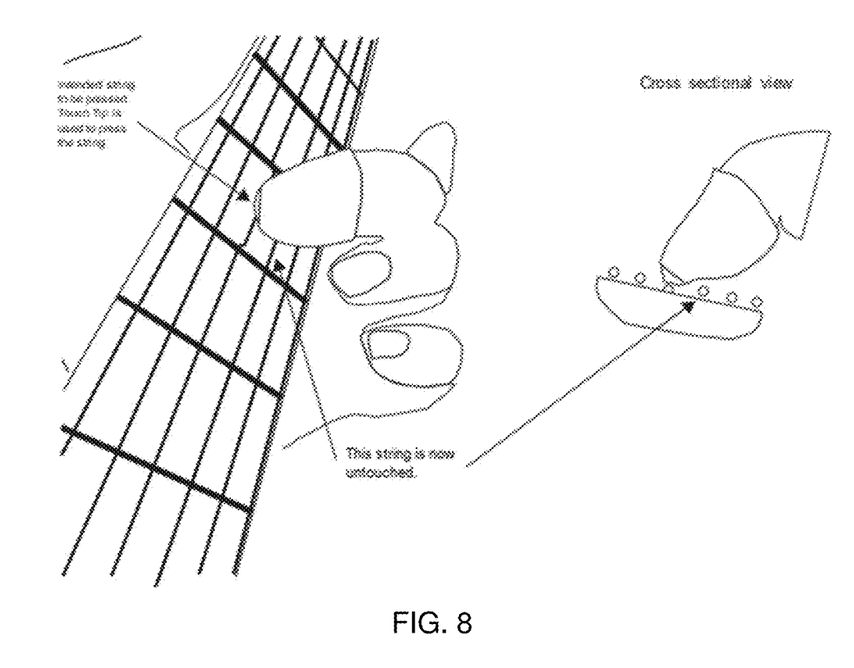
FIG. 8 depicts the user wearing the custom-fitted finger protector of this disclosure and the improved interaction that is enabled by the device.

In one embodiment, a set of one or more finger protector devices is provided. Each device is designed to fit the finger perfectly; in one embodiment, a device of this type also incorporates a structural feature at its distal end specifically designed to successfully press the guitar string without interference as described in sections above. FIG. 7 depicts a representative embodiment of this custom-formed device 700 that includes a custom-designed touch tip. Each finger (or at least some of them) may support a device of this type, and the device supported on each finger typically varies in configuration from another such device, as the user's finger geometry of course is expected to vary even across the user's hand. Preferably, the body of the device 700 is made of a thin flexible material whose inner surface (as a result of the manufacturing method described below) precisely follows (conforms to) the shape of the finger in three (3) dimensions. Preferably, an inner surface is given an offset from the finger surface itself to aid in comfort while maintaining a close fit. For example, a gap of 100 microns between the finger surface and the internal surface may be used. In some cases, the internal surface may also have a negative offset where it is designed to be "shrunken" relative to the finger itself so as to have a tighter fit if so desired. The body shell itself preferably has a specified thickness depending on the softness, flexibility or strength of the material being used. FIG. 7 also demonstrates a structural feature of the device in one embodiment, namely, the addition of a feature at the fingertip, namely, the touch tip 702. This feature is designed explicitly to aid in the pressing of a string. FIG. 8 depicts the playing situation shown in FIG. 3, showing how the touch tip helps to solve the interference problems previously mentioned. Note that FIG. 8 only shows one such device being used on only one finger, but in many cases the other fingers (or at least some of them) may also be fitted with custom fingertip devices. When the user desires multiple fingers to incorporate the devices, the finger protectors themselves may be supported as part of a larger item, e.g., a glove or partial glove.

Figure 9:
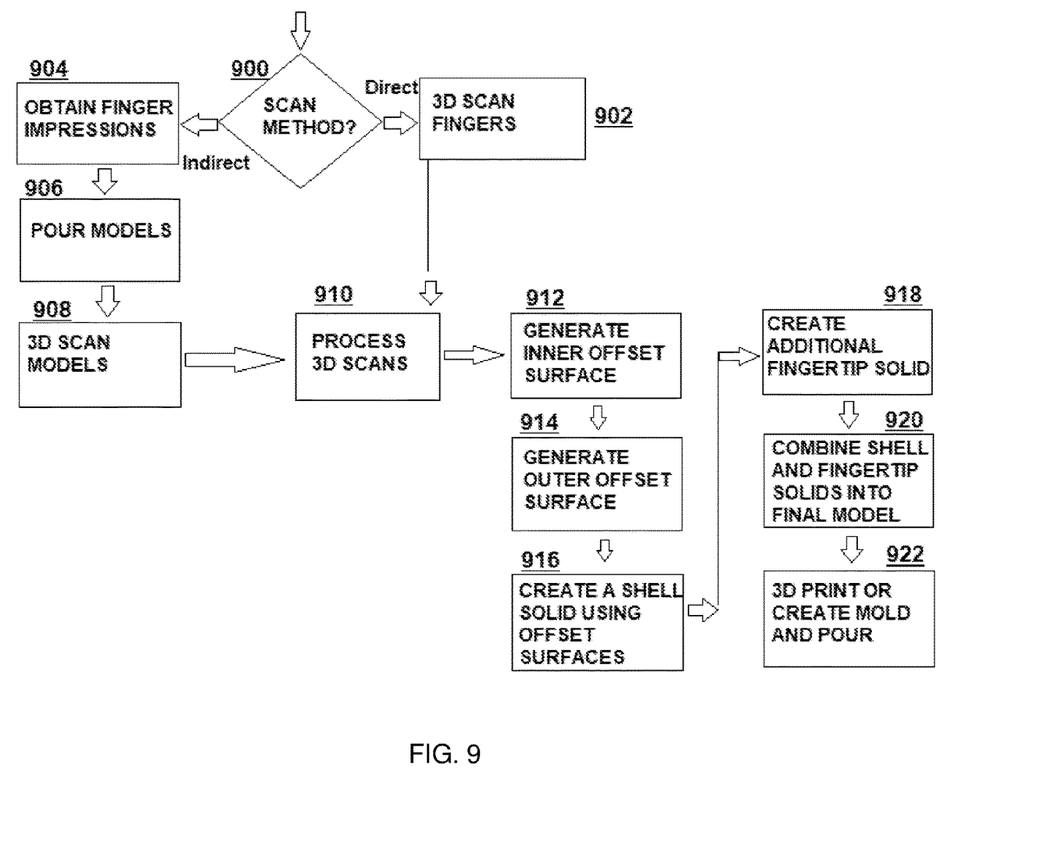
FIG. 9 depicts a method to manufacture the custom-fitted finger protector device of this disclosure.

FIG. 9 depicts a flowchart of a method that may be implemented to design and manufacture the finger protector devices of this disclosure. Generally, the process begins by acquiring a 3D model of each finger. This can be done either directly or indirectly. In the direct method, a 3D scanning technique preferably is used to capture the 3D geometry of a finger by scanning the finger directly. Various methods can be used, including without limitation structured light scanning, laser triangulation scanning, photogrammetry-based scanning, confocal-based scanning, etc. Whichever technique(s) are used, the result is a 3D mesh representing each finger. In the same manner, the entire hand can also be scanned if a single appliance is to be designed (for example, a custom glove with attached finger devices). The indirect method preferably involves make an impression of each finger (including if desired the entire hand), using for example a vinyl polysiloxane (VPS) putty. The impression can then be used to make a model, which can be 3D scanned at a later stage, or even the impression itself can be scanned and then "inverted" to obtain the 3D mesh representing the finger.

Figure 14:
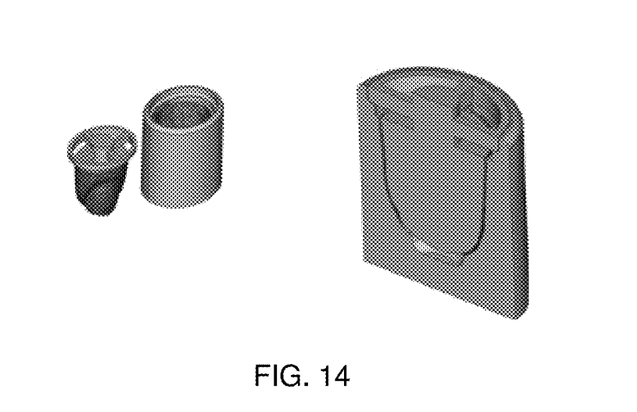
FIG. 14 depicts a mold that may be used to create the device in an alternative embodiment.

Thus, at step 900 a determination is made regarding whether direct or indirect scanning will be used. If direct scanning is used, the routine branches to step 902 to perform the 3D scan of the user's anatomy. The process then continues at step 910 to process the 3D scans. Alternatively, if the indirect method is used, the user's finger impressions are obtained at step 904. One technique to obtain each impression is to provide the user a kit that includes a vial of two (2) parts vinyl polysiloxane putty. One part is the base VPS material, and the other part is a catalyst. The two parts are each packaged separately. The user opens up the individual packages and mixes them. A chemical reaction is initiated that causes the material to harden (set) within a given time (e.g., 2 minutes). During that time period, the user places the putty back in the vial and inserts his or her finger. The resulting impression reproduces dimensions and details accurately, and it is stable over time. Once the impression is taken, the material finally hardens (e.g., after 4-5 minutes), the vial is sealed, and then it is posted to the manufacturer/fabricator. The manufacturer receives the vial and removes the impression. If present, identifying information (e.g., a fingerprint) can be masked or otherwise obscured. At step 906, a model of the impression is poured, which result in a 3D model of the anatomy that is then scanned at step 908. Processing then continues at step 910 as before. At step 912, and as described in more detail below, one or more inner offsets for the device are defined. At step 914, and as also described further below, one or more outer offsets for the device are defined. At step 916, and based on the defined offsets, a solid shell is defined. This solid shell is sometimes referred to herein as an adjusted 3D model. At step 918, any touch tip selected for inclusion also is modeled. It is not required that a touch tip (or other additional structure) be included in a given finger protector device. At step 920, a final model is generated. At step 922, the finger protector is formed, typically by 3D printing (or by using a separate mold as depicted in FIG. 14).

Figure 10:
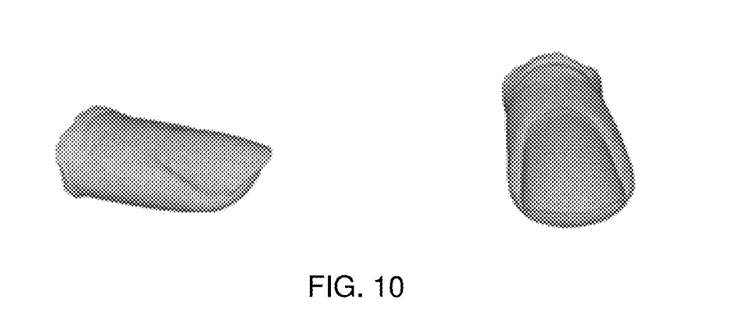
FIG. 10 depicts several views of a 3D scan of a user's finger.

FIG. 10 shows a sample mesh captured for a finger. This demonstrates a case with an untrimmed finger nail. Using the indirect technique described above, this finger was scanned by taking a VPS impression of a finger, then pouring a white plastic model from that impression. The white model was then scanned using an Einscan SP 3D scanner. Just as easily, however, this finger could have been scanned directly using an appropriate 3D scanning technique. In either case, the scan data is then transferred from the 3D scanner to a computing machine (e.g., a desktop computer, a laptop computer, a mobile device, an Internet appliance, etc., each having a processor, memory, input/output devices, an operating system, and one or more applications and utilities, etc.), which has appropriate functionality (e.g. computer-aided design (CAD) software) to compute the one or more inner and outer offset surfaces, to form solid 3D models using the offset surfaces, and to further design in additional 3D features such as the previously-mentioned finger touch tip. The next step of the process following the transferring of the data is to form one or more inner offset surfaces, which comprises the internal surface of the device. This is done so that the finger protector is beneficially not be too tight, e.g., so as the preserve sensitivity in use when positioned on the user's finger. In one embodiment, an inner offset surface of 100 microns (for at least a portion of the device) is a useful inner offset. Any offset amount ranging from 0 to high values, or even negative values may be used. A negative value would result in a surface which is smaller or shrunken with respect to the original finger and may be used if a particular musician wishes to have a tighter design for the protector (or some portion thereof).

The offset surface may be computed, for example, by computing an isosurface, where each point of the isosurface is defined to be the desired offset amount from the original scanned data. A signed distance can then be used in the case where the scanned data has normal for each point, which is typical for the output of modern 3D scanners. This offset isosurface may then be extracted, for example, using a marching cubes algorithm. In the same way, an outer offset surface is formed for the outer surface of the device by offsetting by an amount larger than that of the internal surface as described above. For example, an offset surface of 1.1 mm, although this is not a limitation. Note that, typically, an inner offset surface (or portion thereof) is contained within an outer offset surface (or portion thereof).

Figure 11:
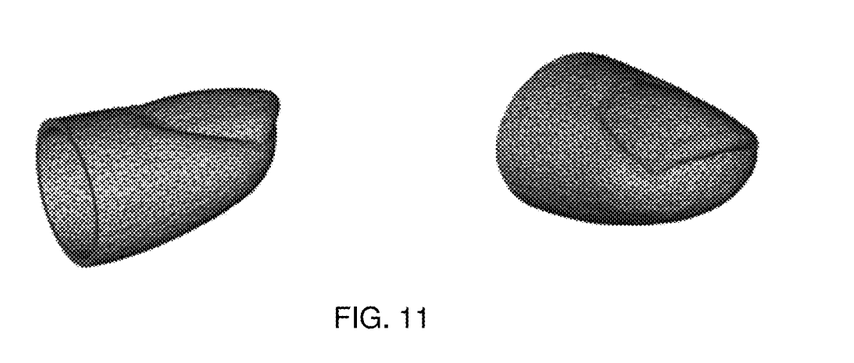
FIG. 11 depicts several views of a solid shell model created from one or more offset surfaces configured from the 3D scan shown in FIG. 10.

Once the two (i.e., the inner and outer) offset surfaces have been created, a solid model is forced by using those two surfaces as a boundary. FIG. 11 shows an example of such a model where the inner surface is offset from the 3D scan data of the finger by 0.1 mm, and the outer surface is offset from the 3D scan data of the finger by an offset of 1.1 mm. The resulting 3D solid is thus a 1 mm thick shell that will fit over the original finger precisely and comfortably.

Figure 12:
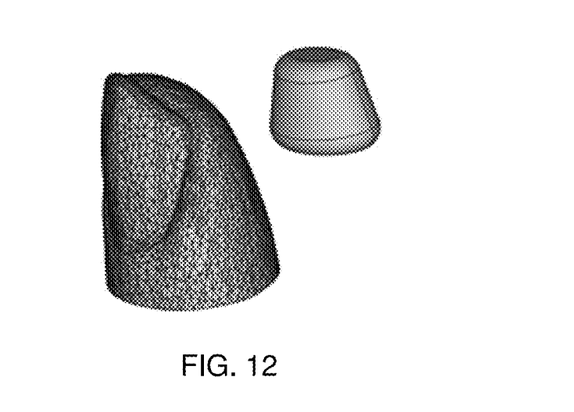
FIG. 12 depicts selection of an appropriate string feeler (touch tip) to be added to the shell model of FIG. 11.
Figure 13:
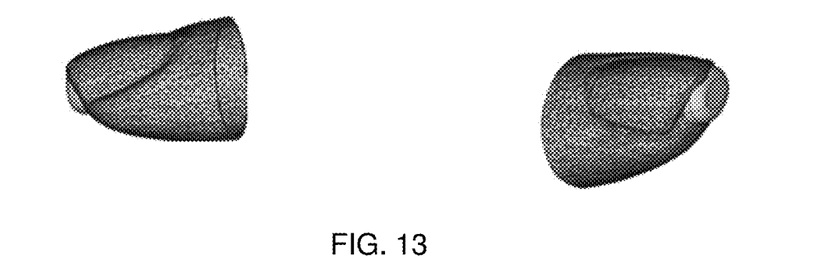
FIG. 13 depicts a solid shell model that has been augmented to incorporating the selected touch tip.

When the optional touch tip is included (to aid the user in pressing the guitar strings more precisely), the tip is selected from a library of available shapes, depending on the purpose. FIG. 12 shows one such possible shape in relation to the fingertip shell created in the previous step. The design may be varied according to the actual stringed instrument being chosen, the size of the user's finger, or personal preference of the musician. Preferably, the touch tip (as selected) is then scaled and placed as required according to the requirements of the person who will be using the device. Once the touch tip is in the required position, a new solid model is created, e.g., by using Boolean operations (on data sets representing the models). An example of such a solid model is show in FIG. 13.

The next step in the manufacturing process is to manufacture the device out of a suitable material. It is desired to use a soft, pliable or rubbery material for maximum comfort and also to allow the user to feel through the device as much as is possible. This can be optimized by choosing a material of the desired Shore Hardness as well as by varying the thickness of the material itself. Preferably, the fingertip devices are made of an elastomeric material in a soft category, namely with Shore hardness numbers in the range of 10 to 80. Other hardness values may of course be used. As noted, preferably devices are manufactured directly using 3D printing technology, for example using printable Thermoplastic Polyurethane (TPU). Different types of material (hard, soft, elastic, low friction, or combinations thereof) may be used. The benefit to using 3D printing technology is that the solid model of FIG. 13 can be imported easily into 3D printing slicing software, and then the resulting G code slicing file executed on a 3D printer using a flexible material. No further design work is required. Other printers (e.g., FormLabs Stereolithography (SLA) may be used, together with FormLabs flexible or elastic resins, or other similar third party resins. As an alternative to 3D printing, the device may be manufactured by designing a mold out of the solid model. An example of such a mold is show in FIG. 14. The right side of FIG. 14 is a cross-sectional view of the mold showing the desired thickness of 1 mm, highlights the added touch tip feature that was added, and also demonstrates how the internal surface is conforming with the original finger surface. An advantage of using a mold is to allow a broader range of materials, including those not available through 3D printing.

The devices may also be customized in creative ways according to the wishes of the musician and in case cases the customizations may also have functional benefits. For example, the devices may have other materials added to the soft base material, such as various pigments, powdered metals, cloth threads, etc., to allow for unique looking devices. The additional cosmetic materials may also be varied in different places in the device. For example, a different color fingernail may be simulated by changing the added material in the region where the fingernail would usually be located. A logo or other indicia may be incorporated into the finger protector or printed thereon.

As another variant, an active device may be incorporated into or otherwise supported in the touch tip that is added at the tip of the device. For example, one such active device is a LED (light emitting diode). The LEDs may then be configured to respond to touch or pressure and light up with different colors depending on which finger is being used or even varying according to the pressure applied. In one embodiment, a pressure sensitive sensor (such as a button) is added to the inside of the touch tip and used to transmit a signal to a receiver, which keeps track of which finger is touching a string and exactly when it touched (e.g., relative to other fingers). The addition of such an active element into the touch tip is then used then beneficially to monitor and track the action of the individual fingers as well as possibly providing a visually interesting highlight (through colored lights from the LED's) of the fingers in action.

Figure 15:
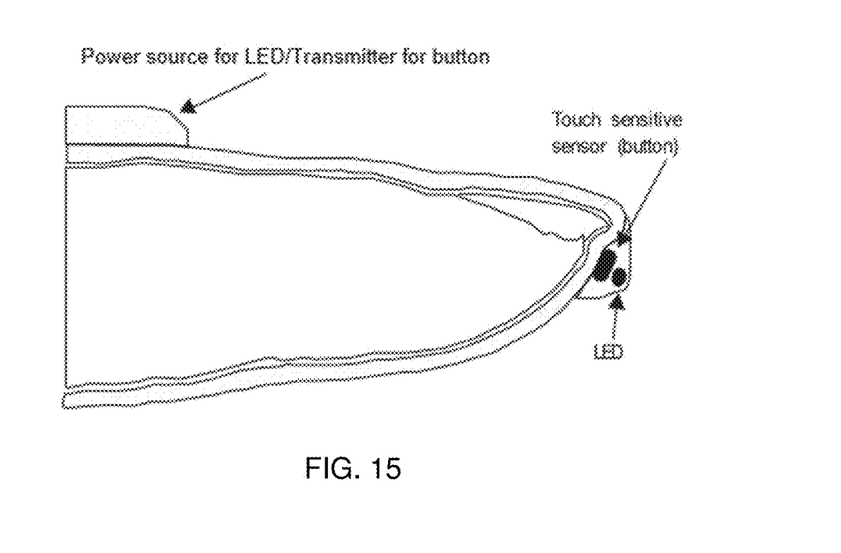
FIG. 15 depicts an alternative embodiment of the finger protector that includes an active device built into the touch tip.

FIG. 15 shows an example of one such active devices built into the touch tip. Such fingertip devices could contain an LED, or a touch sensitive device, or both. In the case of a touch sensitive device, there may also be provided a power source and a miniature transmitter. In the case of an integrated LED, a power source is included, e.g., in the form of a miniature battery that is contained within the device itself as shown. The particular active device and its operations may vary, depending on implementation.

Another type of active device that may be incorporated into the finger protector is a heating element.

A finger protector may include holes (or other cutout portions) to enable dissipation of heat or perspiration, or to facilitate movement of finger joints (e.g., for longer protectors).

A finger protector may have distinct regions, and one or more such regions may have different texturing, coloration, fitting characteristics, and the like. Thus, a particular finger protector need not be of unitary configuration throughout.

Figure 16:
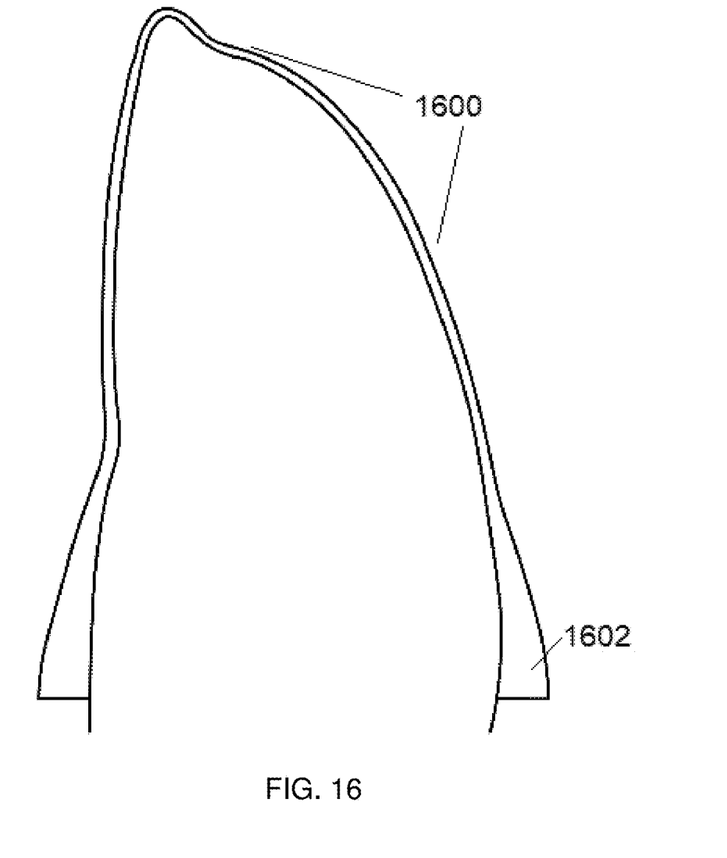
FIG. 16 depicts another embodiment of the finger protector including an outer band at its opening, and being positioned on a user's finger.
Figure 17:
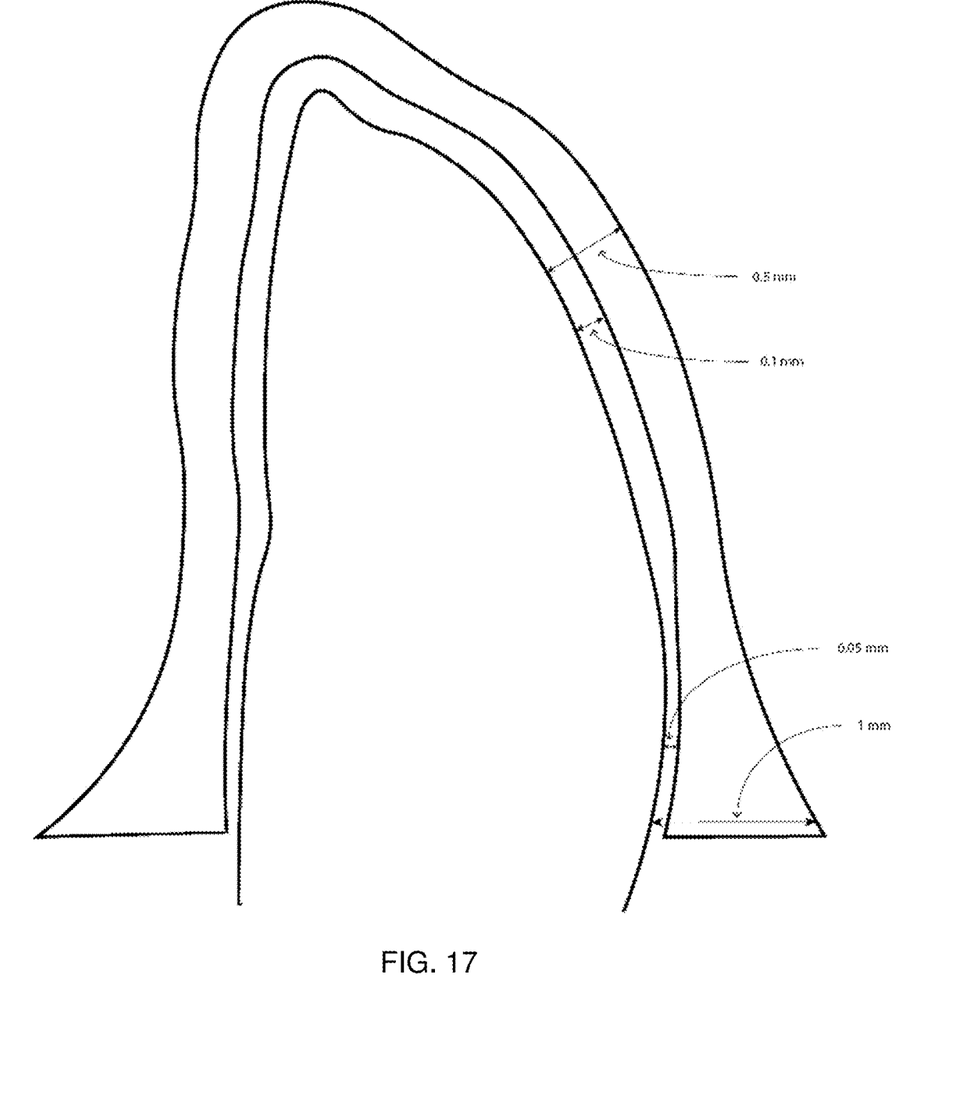
FIG. 17 depicts the structural configuration of the finger protector of FIG. 16 in additional detail.

FIG. 16 depicts another embodiment of the finger protector 1600 including an integral thickened region 1602 at its opening, and being positioned on a user's finger. This thickened portion is sometimes referred to as a band, and it is desirable to provide additional structural integrity to the device so that it is not damaged upon the anticipated frequent placement/removal from the user's finger. FIG. 17 depicts the structural configuration of the finger protector of FIG. 16 in additional detail. As depicted in FIG. 17, an internal offset is between 0.05 (50 microns)-0.1 (100 microns) mm. Thus, this embodiment depicts that there may be one or more internal offsets, and it is not required that the offsets be positive values. A negative internal offset means that the internal surface is configured to compress against the finger surface to form a tighter fit. As shown in this embodiment, there may one or more external offsets as well, e.g., 0.5 mm (500 microns) in the main body portion. The integral band encircling the opening is wider and, in this example, extends up to 1 mm (1000 microns) thick, which represents the outer offset. As used herein, and as shown in FIG. 17, an "offset" typically is perpendicular (a normal) and is measured from a surface of the user's finger. As such, an "inner offset" in effect represents a gap between the user's finger surface and the inside surface of the device and, as noted above, there may be multiple different inner offsets within the device itself (with respect to the same finger) such that a portion of the device (a negative inner offset region) is tightly-fitting while another portion of the device (a positive inner offset region) is looser (but still close fitting evidencing the customized-nature of the fit). To provide a more concrete example, such an arrangement may be characterized as one having an inner offset surface comprising, e.g., at least two (2) joined parts, where the first part is at an offset of approximately 100 microns, and the second part is at an offset of approximately −100 microns. This is just an example set of ranges, of course, and there may be more than two such joined parts (with distinct inner offsets). In like manner, the outer offsets may be associated with multiple sections having two values, e.g., an outer offset surface comprising at least two (2) joined parts, where the first part is at an outer offset of approximately 500 microns and the second part is at an outer offset of approximately 1000 microns. Once again, the number of joined parts and the ranges are merely exemplary.

Generalizing, a particular protector device comprises multiple (e.g., two or more) subdivisions of internal and external offset surfaces.

Figure 18:
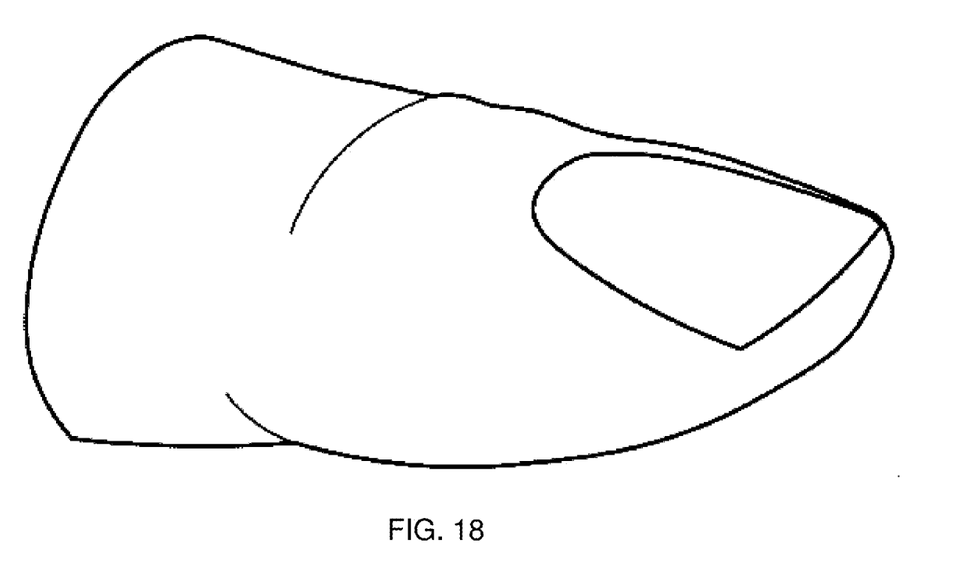
FIG. 18 is a perspective view of a model of a user's finger.
Figure 19:
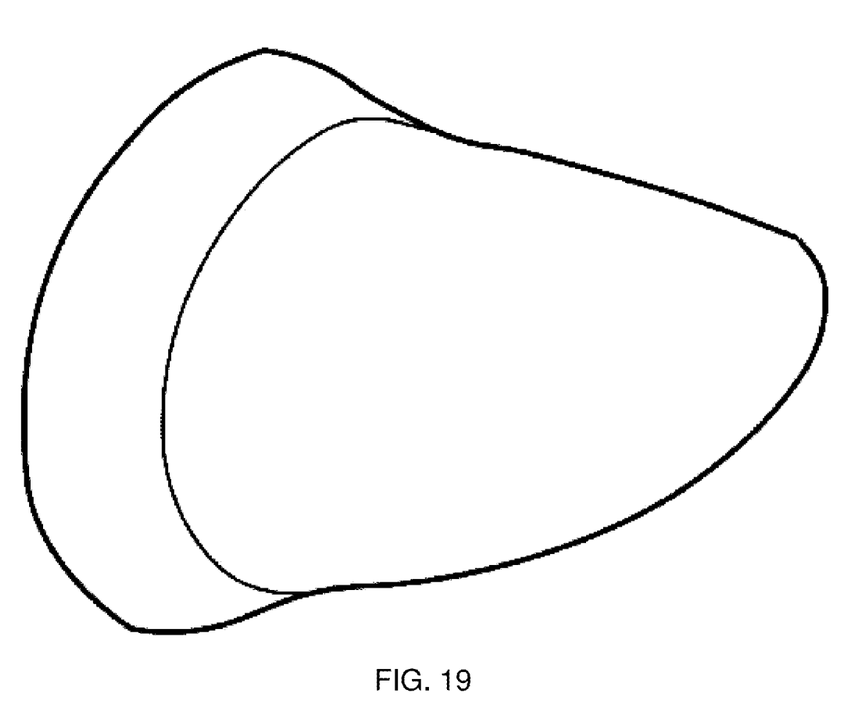
FIG. 19 is a perspective view of a model of the finger protector of FIG. 17.
Figure 20:
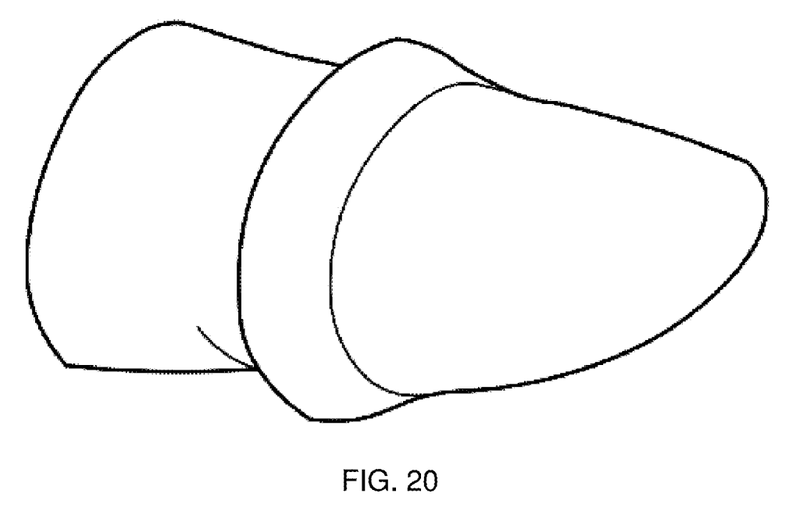
FIG. 20 is a perspective view of the model of FIG. 19 positioned on the user's finger modeled in FIG. 18.

FIG. 18 is a perspective view of a model of a user's finger. FIG. 19 is a perspective view of a model of the finger protector of FIG. 17. FIG. 20 is a perspective view of the model of FIG. 19 positioned on the user's finger modeled in FIG. 18.

One or more of the manufacturing steps may be carried out online or in association with a website or mobile app.

According to a further manufacturing variant, here the scan (e.g., of the finger directly, or of the impression) may be used to print a mold (instead of the final protector). The mold is then used to make the finger protector, e.g., out of a material that itself cannot be 3D printed. The mold would contain a cavity approximately the shape of the data model (as noted above, typically one that is adjusted to include the inner and/or outer offset surfaces). The finger protector mold itself could then be 3D printed from the adjusted data model or manufactured through other known means (e.g., CNC machining), and the finger protector then formed from the finger protector mold.

While FIG. 9 depicts a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the device have been described separately, one of ordinary skill will appreciate that they may be combined.

The described commercial products, systems and services are provided for illustrative purposes only and are not intended to limit the scope of this disclosure.

The techniques herein provide for improvements to technology or technical field, as well as improvements to various technologies, all as described.

What we claim is as follows:

1. A method of making a finger protector, comprising:
   scanning a physical model of a human finger to generate a first data model;
   adjusting the first data model to incorporate one or more inner offset surfaces, and one or more outer offset surfaces, wherein the one or more inner offset surfaces are contained within the one or more outer offset surfaces;
   generating a second data model based on the adjusted first data model; and
   3D printing the finger protector from the second data model, the finger protector being customized to an anatomy of the human finger.

2. The method as described in claim 1 further including:
   receiving an impression of the human finger;
   creating the physical model from the impression.

3. The method as described in claim 1 wherein the one or more inner offset surfaces are between approximately 0.05-0.1 millimeters thick as measured from a surface of the human finger to an interior surface of the finger protector.

4. The method as described in claim 1 wherein the one or more outer offset surfaces are between approximately 0.5-1.0 millimeters thick as measured from a surface of the human finger to an exterior surface of the finger protector.

5. The method as described in claim 4 wherein the finger protector is 3D printed with a band at an opening thereof.

6. The method as described in claim 2 wherein the impression is formed of vinyl polysiloxane (VPS).

7. The method as described in claim 1 wherein the finger protector is formed of thermoplastic polyurethane (TPU) or SLA printable resin having a Shore hardness of less than 80.

8. The method as described in claim 1 further including incorporating an additional structural element into the finger protector.

9. The method as described in claim 8 wherein the additional structural element is one of: a touch tip, an LED, a heating element, and a touch sensitive device.

10. The method as described in claim 2 further including:
    providing a kit that includes a first package containing an active material, and a second package containing a catalyst material, wherein contents of the first and second packages are configured to be selectively combined to form a settable impression material into which the human finger is received to form the impression.

11. The method as described in claim 1 wherein scanning is one of: structured light scanning, laser triangulation scanning, photogrammetry-based scanning, and confocal-based scanning.

12. The method as described in claim 1 wherein an inner offset surface has a negative offset value relative to a surface of the human finger to compress an associated portion of the finger protector against that surface.

* * * * *